Patented Jan. 7, 1941

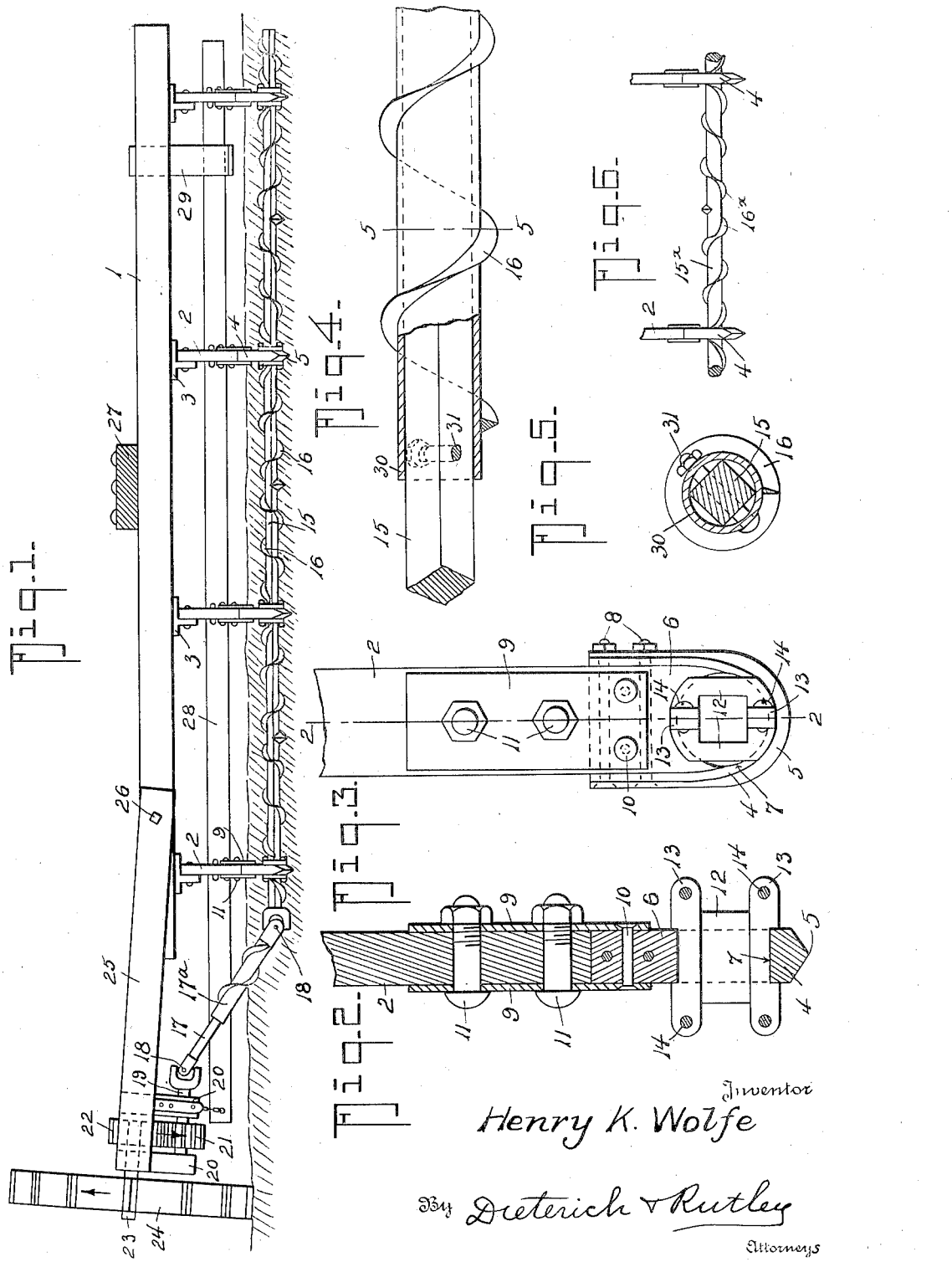

2,227,527

UNITED STATES PATENT OFFICE 2,227,527

ROTARY ROD WEEDER

Henry K. Wolfe, Pasco, Wash.

Application January 3, 1940, Serial No. 312,280

8 Claims. (Cl. 97—42)

My invention relates to certain new and useful improvements in rotary rod weeders, and it particularly has for its objects: to provide the rod with means working out from the bearings right and left toward the center for the purpose of clearing the rod bearings of roots and trash, to make it easier for the rod to penetrate the ground and release stiff roots like wild rose, briars, or other woody roots more readily, and to accomplish these purposes without requiring more power than would the ordinary rod, possibly not as much, owing to the carving action of the auger at the bottom of the rod; further the invention includes a special construction of shoe for use with the improved rod means.

Other objects of the invention will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a rear elevation and part section of one form of rotary rod weeder with the invention applied.

Fig. 2 is a section on the line 2—2 of Fig. 3.

Fig. 3 is a side elevation of the improved shoe.

Fig. 4 is an enlarged detail elevation and part section showing a modification of the invention.

Fig. 5 is a cross section on the line 5—5 of Fig. 4.

Fig. 6 is a detail view of a modification later again referred to.

In the drawing, in which like numbers of reference indicate like parts in all the figures, I represents the front transverse frame on the underside of which, at suitable intervals, are secured a set of brackets 3 from which project downwardly the supports 2 to the lower ends of which the shoes are fastened by means of strap plates 9 and bolts 11. The supports 2 may be straight or goose-neck, as desired.

Each shoe comprises a U-shaped element 4 having its lower end beveled to V-shape-in-section, as at 5, and curved to form one half of a bearing 7, the other half of which is formed by the lower end of a block 6, inserted between the legs of the U and secured thereto by bolts and nuts 8. The straps 9 are permanently secured to the block 6 by welding or by rivets 10, as may be desired.

The spool which carries the rod is, in this instance, formed in two parts or halves 12 having ears 13 through which screws 14 are passed to secure the parts of the spool together and to the rod 15, preferably tightly.

Between each pair of shoes the rod 15 is provided with a pair of worms or spiral blades 16 running from the bearings right and left toward the center; the ends of the rod also have worms 16 running from the end bearings.

The driving shaft (telescopic) 17—17$^a$ may also have a worm on the ground section to clear the lower universal joint 18.

The upper end 17 is connected by a universal joint 18 with the shaft 19 that carries a spur gear 21 and is journaled in bearings in brackets 20 that are carried by the extension frame 25. The frame 25 is pivoted to the beam 1 at 26 and carries at its free end the shaft 23 for the traction wheel 24. The shaft 23 has a gear 22 to mesh with gear 21. 27 is the longitudinal beam that is fastened at one end to the beam 1 and at its other end carries the usual caster wheel (not shown, but see Letters Patent #1,232,149). 28 indicates the hitch bar of the usual construction and 29 designates the usual runner bar, all of which may be of known construction.

Instead of securing the worms 16 directly to the square rod 15 (which can be done by welding), they may be secured to lengths of pipe 30 of a size to fit on the rod 15 and extend from spool to spool. The pipe 30 may be secured in any desired way to the rod, as for example, by bolts and nuts 31.

Further, as shown in Fig. 6, the worms 16$^x$ may be secured directly to a round rod 15$^x$, in which event the bearing spools will be unnecessary.

From the foregoing description, taken in connection with the accompanying drawing, it is thought the complete construction, combination and arrangement of parts and advantages of the invention will be clear to those skilled in the art, and I desire it to be understood that changes in the details of construction may be made without departing from the invention and the scope of the appended claims.

What I claim is:

1. In rotary rod weeders, the combination with a set of spaced bearing shoes and spools, of a rotary rod of angular cross section having worms running right and left from the respective spools.

2. In rotary rod weeders, having spaced bearing shoes and spools, a rotary rod mounted in said spools and having spiral blades extending right and left from the spools toward the middle of the space between the spools.

3. In rotary rod weeders, having spaced bearing shoes and spools, a rotary rod mounted in said spools and having spiral blades extending right and left from the spools toward the middle of the space between the spools, and a driving shaft connected to the rod and also having a spiral blade running away from the place where the driving shaft is connected to the rod.

4. In rotary rod weeders, the combination with a set of spaced bearing shoes and spools, of a rotary rod having worms running right and left from the respective spools.

5. In rotary rod weeders, having spaced bearing shoes and spools, a rotary rod mounted in said spools and extending through said spools from one side of the machine to adjacent the other, combined with pipes on the rod between each pair of spools, said pipes having right and left spirals running from the ends toward the middle of the pipes, and means to secure the pipes to the rod to turn therewith.

6. In rotary rod weeders, a shoe comprising a U-shaped strap having a half-bearing, a block having the other half-bearing and secured between the legs of the U, straps secured to the block for fastening the shoe to a standard of a weeder, and a rod-carrying spool in said bearing, said spool divided longitudinally into two halves, with detachable means for securing them together in clamping relation to the rod.

7. In rotary rod weeders, the combination with a set of spaced bearing shoes, of a rotary rod having worms running right and left from the respective shoes.

8. In rotary rod weeders, the combination with a set of spaced bearing shoes, of a rotary rod of circular cross section having worms running right and left from the respective shoes.

HENRY K. WOLFE.